(12) United States Patent
Waterman (10) Patent No.: US 12,056,501 B2
(45) Date of Patent: Aug. 6, 2024

(54) PERIPHERAL DEVICE COMMUNICATION

(71) Applicant: NCR Voyix Corporation, Atlanta, GA (US)

(72) Inventor: Simon Waterman, Somerset (GB)

(73) Assignee: NCR Voyix Corporation, Atlanta, GA (US)

( * ) Notice: Subject to any disclaimer, the term of this patent is extended or adjusted under 35 U.S.C. 154(b) by 0 days.

(21) Appl. No.: 17/949,556

(22) Filed: Sep. 21, 2022

(65) Prior Publication Data

US 2024/0095041 A1    Mar. 21, 2024

(51) Int. Cl.
| | |
|---|---|
| *G06F 9/44* | (2018.01) |
| *G06F 8/41* | (2018.01) |
| *G06F 9/4401* | (2018.01) |
| *H04L 67/00* | (2022.01) |

(52) U.S. Cl.
CPC .............. *G06F 9/4415* (2013.01); *G06F 8/41* (2013.01); *H04L 67/34* (2013.01)

(58) Field of Classification Search
None
See application file for complete search history.

(56) References Cited

U.S. PATENT DOCUMENTS

| | | |
|---|---|---|
| 2004/0215754 A1 | 10/2004 | Orleth |
| 2005/0257226 A1 | 11/2005 | Belvin |
| 2013/0003643 A1 | 1/2013 | Mukai |
| 2017/0228182 A1 | 8/2017 | Novak |
| 2019/0015604 A1 | 1/2019 | Gharib |
| 2022/0263835 A1 | 8/2022 | Pieczul |
| 2023/0072152 A1* | 3/2023 | Hamlin ................. G06F 21/608 |

FOREIGN PATENT DOCUMENTS

| | | |
|---|---|---|
| JP | H06-304558 A | 10/1994 |
| JP | 2004303252 A | 10/2004 |
| JP | 2024509739 A | 3/2024 |

OTHER PUBLICATIONS

Japan Notice of Reasons for Refusal for corresponding Japanese Patent Application No. 2023-012464, drafted Mar. 26, 2024.
European Search Report for corresponding European Patent Appl. 22202417.6 dated May 12, 2023.
European Examination Report for corresponding European Patent Appl. 22202417.6 dated Apr. 22, 2024.

* cited by examiner

*Primary Examiner* — Scott C Sun
(74) *Attorney, Agent, or Firm* — Notaro, Michalos & Zaccaria P.C.; John S. Economou (57) ABSTRACT

A method, a computing device and a computer program is disclosed. A method comprises receiving, from a module comprising first executable software that is executable on one or more processors of a computing device, first data indicative of at least one class of peripheral device connectable to the computing device, whereby each class is associated with a plurality of predetermined peripheral devices and providing a software container element that contains second executable software that is executable on said one or more processors of the computing device, whereby the software container element is associated with peripheral device connection data that enables the software container element to have access to and communicate with each peripheral device of the plurality of predetermined peripheral devices associated with each class.

19 Claims, 8 Drawing Sheets

PERIPHERAL DEVICE COMMUNICATION

FIELD

The present invention relates to a method and computing device for providing a software container element that is configured to have access to each peripheral device of a predetermined set of peripheral devices associated with a particular class, regardless of whether a predetermined peripheral device is connected when the container element is executed or connected later. In particular, but not exclusively, the present invention relates to a methodology whereby a device plugin software container advertises its resources as a class of peripheral device connectable to a self-service terminal or point of sale terminal. The class is associated with a predefined set of peripheral devices. A software container can then be provided on a terminal having access to all peripheral devices within that class by associating with the software container peripheral device connection data indicative of a device pathway for each peripheral device of the class.

BACKGROUND

It is known that self-service terminals (SSTs) and/or Point of Sale (POS) terminals are used from time to time in the retail industry. SSTs and POS terminals are typically used to enable a customer to conduct transactions with a retail establishment. Each SST or POS terminal in any retail establishment may be connected to different peripheral devices. Each SST or POS terminal may also execute different software, such as having different underlying operating systems (Linux, Windows etc.) and different software applications. This is typically dependent upon the retail establishment where the SST or POS terminal is used, and the intended use of the SST or POS terminal in the retail establishment. From time to time, the software executing on the SST or POS terminal may also be upgraded or the connected peripheral devices may change.

Due to the variations that are often present from terminal to terminal, software developers have started making use of software containers that contain the software that needs to be executed on an SST or POS terminal. Software containers isolate the running software thus helping to avoid complex platform dependencies. That is to say that they are able to execute on one or more processors of a terminal independent of the computing environment of that terminal. This is because a software container contains all of the software (application code as well as any software dependencies) it needs to be executable in any computing environment. Additionally, as these containers operate in their own isolated computing environment (except for certain predefined communication pathways with other software/hardware (such as access to specific files, specific ports) outside the software container), this also makes them particularly secure. Software containers are thus an effective way of packaging and distributing software for use on SSTs and POS terminals. When a software or hardware upgrade is performed on a terminal, a new software container can be executed on the terminal that accounts for these upgrades. Also, since the containers can be pre-built, this can help avoid complex builds on every terminal. It is noted that software containers are different to virtual machines in that they do not require a hypervisor to be installed on the computing device. Software containers are also typically more lightweight and run faster than virtual machines. Furthermore, whereas virtual machines virtualize the entire computer system, software containers virtualize the operating system. Software containers also share a single operating system whereas each virtual machine has its own operating system.

When deploying a software container, a container engine (such as docker, RKT, CRI-O, and LXD or the like) is utilized. The container engine can accept user requests or requests from an API server of a container orchestrator (such as Kubernetes, Swarm, Mesos, or the like), pull image files (in a particular image format) from a registry, prepare a container mount point, prepare metadata that is needed to execute a software container and call a container runtime. The container runtime is a part of the container engine. The container runtime (such as runc, containerd, crun, railcar, katacontainers, or the like) uses the mount point and the metadata provided by the container engine and communicates with the kernel (of a host OS) running on the computing device in order to execute a container image file and thereby create a software container.

When implementing multiple containers across multiple computing devices, a software container orchestrator platform is often used. These platforms are able to schedule container workloads across multiple computing devices (e.g., SSTs or POS terminals) and are also able to provide a standardized application definition file (e.g., kube YAML, docker compose, or the like). Kubernetes is an example of a container orchestration platform.

A Kubernetes container orchestration platform is a cluster of units, including a controlling unit called the Kubernetes master, which manages the cluster, and at least one node (or worker) which runs workloads (containers). One part of the Kubernetes orchestrator platform is the kubelet. The kubelet is an agent that runs on every worker which is part of the Kubernetes system. During operation, the kubelet receives commands (from an API server on a Kubernetes master) that informs the kubelet what container(s) should be running on a computing device. In Kubernetes, these containers are provided within 'pods'. Typically a single pod includes a single container although it is possible to include multiple containers within a pod. The kubelet passes information regarding what container(s) should be running on a computing device to a container engine (e.g., via a Container Runtime Interface (CRI)) for execution of a software container via a container runtime within the container engine.

A software container is created when a container runtime executes an executable container image file. As such, a software container is essentially a runtime instance of an associated executable container image file. In this sense, an executable container image file is an image file that has all of the software it needs to at least be executable as a software container element. In more detail, a container image file is typically a binary file that includes all the necessary requirements for running a software container, in addition to any metadata describing needs and capabilities of the software container. The container image file itself is made up of several layers that define the executable instructions needed for running the software container. For example, a container image file may include several layer(s) which define a software application(s) executable code, several layers(s) defining code for any software dependencies upon which the software application(s) rely, and several layer(s) defining code for any required configuration settings. Container image files are often stored in a container image registry. Each container image file is stored in a particular container image format that defines the layers and metadata within a container image file. For example, the Open Container Initiative (OCI) image format defines the image file as tar files for each layer and a manifest file in JSON format which specifies the metadata associated with the image file.

When deploying software containers on SSTs and POS terminals, it is desirable to run device driver/handling software inside a container as this means device drivers and their related software can be distributed, managed and maintained in the same way as all other software within the container. However, this approach usually requires the container to be privileged, which means that the container has most of or all root capabilities of the underlying host computing device, thus allowing access to resources which would not be available in non-privileged containers. Providing software containers with privileged access is thus a security risk and against deployment best practices. This is particularly concerning in retail given the need for SSTs and POS terminals to have robust security.

In order to avoid privileged operation, current techniques typically require a container to know exactly the set of devices that it needs to access in advance. That is, when executing a container, the container is provided with data indicating only the peripheral devices that it will need to access during operation. In order for this approach to be successful, it is noted that those devices also need to be present when the container is first executed. If the devices are not present (e.g., they are not plugged in), the container will be unable to communicate with these devices when they become available (e.g., once they are plugged in). It will be appreciated that this approach therefore prevents device plug-and-play or unplug-replug scenarios.

SUMMARY

It is an aim of the present invention to at least partly mitigate one or more of the above-mentioned problems.

It is an aim of certain embodiments of the present invention to help provide a software container that can communicate with any predefined peripheral device connectable to an SST or POS terminal, without having to specify in advance which devices will actually be connected.

It is an aim of certain embodiments of the present invention to help avoid the need to provide custom container specifications (e.g., Kubernetes pod specifications) that conform to different hardware setups (e.g., different peripheral devices) on different terminals.

It is aim of certain embodiments of the present invention to help provide container specifications that do not need to adapt to different hardware setups on a terminal or the presence or absence of specific devices on execution of a software container.

It is an aim of certain embodiments of the present invention to help provide an SST or POS terminal which executes a software container which can communicate with peripheral devices that are plugged in after initial execution of the software container or that are unplugged and replugged after initial execution of the software container.

It is an aim of certain embodiments of the present invention to help maintain communication between a software container and a peripheral device even if a firmware update results in the detected presence of the device temporarily disappearing and then reappearing.

It is an aim of certain embodiments of the present invention to help provide software containers containing device driver software, where the containers do not need privileged access and can be distributed and managed without compromising on security.

It is an aim of certain embodiments of the present invention to help provide a software container having hot-plug capability, where devices need not be present at time of container startup and if they are added or removed later the system adapts.

According to a first aspect of the present invention there is provided a computer-implemented method for providing a software container element associated with peripheral device connection data that enables the software container element to have access to and communicate with each peripheral device of a plurality of predetermined peripheral devices, the method comprising the steps of: receiving, from a module comprising first executable software that is executable on one or more processors of a computing device, first data indicative of at least one class of peripheral device connectable to the computing device, whereby each class is associated with a plurality of predetermined peripheral devices; and providing a software container element that contains second executable software that is executable on said one or more processors of the computing device, whereby the software container element is associated with peripheral device connection data that enables the software container element to have access to and communicate with each peripheral device of the plurality of predetermined peripheral devices associated with each class.

Aptly, the method further comprises receiving the first data as data indicative of a single class of peripheral device connectable to the computing device, whereby the single class is associated with a plurality of predetermined peripheral devices connectable to a self-service terminal or point of sale terminal.

Aptly, the method further comprises responsive to a new peripheral device being connected to the computing device or to a peripheral device being disconnected and reconnected to the computing device, determining, by the software container element, that the new or reconnected peripheral device is connected to the computing device.

Aptly, the method further comprises storing second data, indicative of the plurality of predetermined peripheral devices associated with each class, in memory accessible by the computing device.

Aptly, the method further comprises prior to receiving the first data, sending a query to the module querying which peripheral devices are connected to the computing device.

Aptly, the method further comprises receiving the first data at a software application responsible for managing software container elements on the computing device.

Aptly, the method further comprises providing the module as a module that is configured to communicate with connected peripheral devices.

Aptly, the method further comprises providing the module as a software container element that contains the first executable software, wherein optionally the module is a device plugin module.

Aptly, the method further comprises responsive to receiving the first data, sending at least one command to the module commanding the module to prepare each of the plurality of predetermined peripheral devices associated with each class for assignment to the software container element.

Aptly, the method further comprises receiving, from the module, third data indicative of at least a respective peripheral device pathway for each of the plurality of predetermined peripheral devices associated with each class.

Aptly, the method further comprises providing the peripheral device connection data as data representative of at least a respective peripheral device pathway for each of the plurality of predetermined peripheral devices associated with each class.

Aptly, the method further comprises storing the peripheral device connection data in a control group associated with the software container element.

Aptly, the method further comprises upon execution of the second executable instructions, determining, by the software container element, which peripheral devices, of the plurality of predetermined peripheral devices associated with each class, are connected to the computing device.

Aptly, the method further comprises responsive to determining, initializing, by the software container element, each peripheral device connected to the computing device.

Aptly, the method further comprises responsive to initializing, sending, by the software container element, one or more commands to at least one of the connected peripheral devices.

Aptly, the method further comprises providing the first executable software and the second executable software as software that is executable independent of computing environment.

Aptly, the method further comprises via the module and the software container element respectively, executing the first executable software and the second executable software in an isolated computing environment.

According to a second aspect of the present invention there is provided a computing device comprising one or more processors configured to execute a software application responsible for managing software container elements on the computing device, wherein the software application, when executed, is configured to: receive, from a module comprising first executable software that is executable on one or more processors of a computing device, first data indicative of at least one class of peripheral device connectable to the computing device, whereby each class is associated with a plurality of predetermined peripheral devices; and provide a software container element that contains second executable software that is executable on said one or more processors of the computing device, whereby the software container element is associated with peripheral device connection data that enables the software container element to have access to and communicate with each peripheral device of the plurality of predetermined peripheral devices associated with each class.

Aptly, the computing device is a point of sale terminal or self-service terminal.

According to a third aspect of the present invention there is provided a computer program comprising instructions which, when executed by a computing device, cause the computing device to carry out the steps of the method defined by the first aspect of the present invention.

Certain embodiments of the present invention help provide a methodology for providing a software container element with peripheral device connection data that enables the software container element to communicate with any of a set of predefined peripheral devices that might be connected to a terminal.

Certain embodiments of the present invention help provide a device plugin container which advertises a class of peripheral device connectable to an SST or POS terminal, the terminal executing a software container that has access to all devices within this class.

It is an aim of certain embodiments of the present invention to help provide a software container which includes data representing a series of dummy device nodes that it is allowed to access. The dummy device nodes are created for all current and future devices of a particular class of peripheral device. A connected peripheral device is accessible at one of the dummy device nodes and the software container is responsible for determining which node is in use and which device is connected.

It is an aim of certain embodiments of the present invention to help provide a computing device that executes software containers and has plug-and-play and unplug-replug capability.

It is an aim of certain embodiments of the present invention to help provide a software container that is configured to have access to all peripheral devices associated with a retail device class.

It is an aim of certain embodiments of the present invention to help provide a container engine with the necessary data it needs to execute a software container which is configured to have access to a series of device pathways where peripheral devices are or may be connected.

It is an aim of certain embodiments of the present invention to help provide a software container which has access to an abstract set of peripheral devices.

BRIEF DESCRIPTION OF THE DRAWINGS

Embodiments of the present invention will now be described hereinafter, by way of example only, with reference to the accompanying drawings in which.

In the drawings like reference numerals refer to like parts.

DETAILED DESCRIPTION

Figure 1:
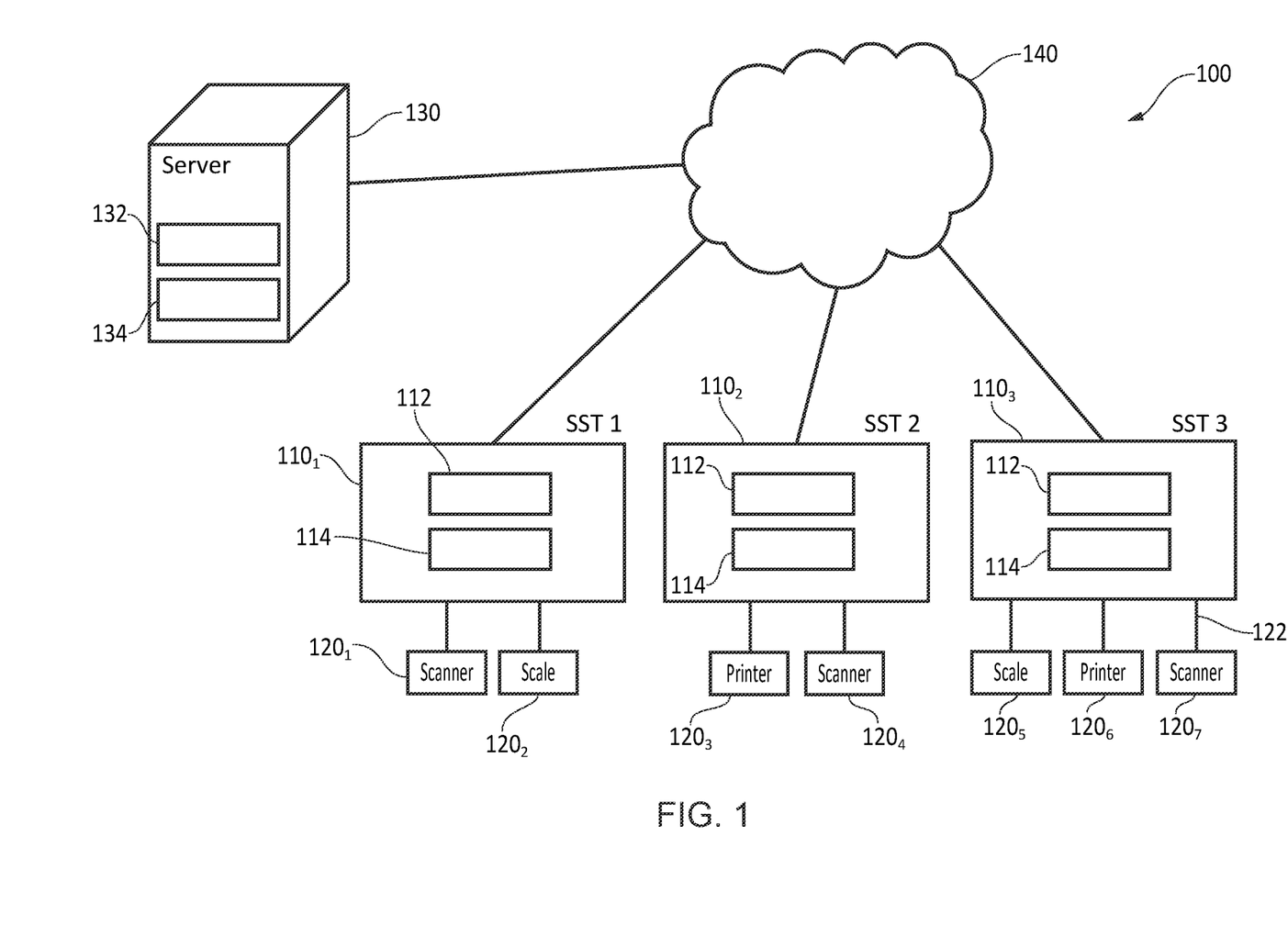
FIG. 1 illustrates a computing system.

FIG. 1 illustrates a computing system 100. In the computing system 100 there are three self-service terminals (SSTs) 1101, 1102, 1103. The SSTs are an example of a computing device. In certain other embodiments of the present invention, the computing device may be a Point of Sale (POS) terminal, an Automated Teller Machine (ATM), a personal computer, a laptop, a tablet or the like. Each SST includes one or more processors 112 and at least one memory 114. The memory is a non-transitory computer-readable storage medium. The memory 114 stores executable software that is executable by the processors 112 of the SST. Each SST may also include a communication interface (not shown) for communicating with a server and one or more communication interfaces (not shown) for communicating with connected peripheral devices. In the system illustrated in FIG. 1, a scanner peripheral device 1201 and a scale peripheral device 1202 is connected to the first SST 1101. Also, a printer peripheral device 1203 and a scanner peripheral device 1204 is connected to the second SST 1102. Also, a scale peripheral device 1205, printer peripheral device 1206 and scanner peripheral device 1207 are connected to the third SST 110¬3. It will be appreciated in certain other embodiments of the present invention each SST may be connected to different combinations of peripheral device. Each peripheral device may communicate with the SST it is connected to via a wired interface 122. It will be appreciated that in certain other embodiments of the present invention the interface may be wireless or a combination of wired and wireless. Each SST communicates with a server 130 via a network 140. The server is also an example of a computing device. The network 140 may be wired, wireless or a combination of wired and wireless. The server 130 also includes one or more processors 132 and at least one memory 134. The memory 134 is also a non-transitory computer readable storage medium. The memory 134 stores executable software that is executable by the processors of the server. The executable software of the SSTs and the server will be described in more detail below.

Figure 2:
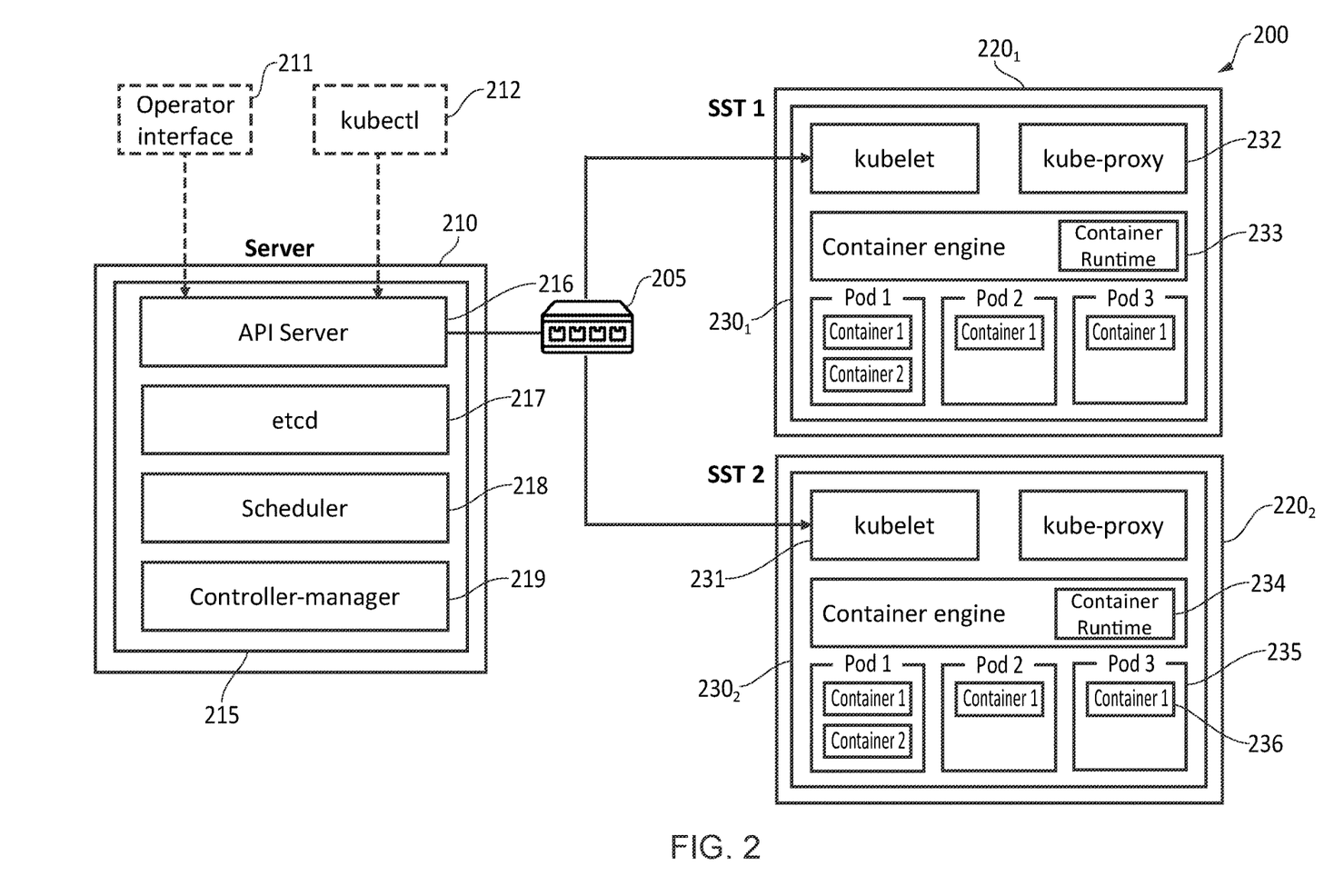
FIG. 2 illustrates a computing system under the control of a Kubernetes orchestration platform.

FIG. 2 illustrates a computing system 200. The computing system has several components under the control of a Kubernetes container orchestration platform. As such, the system may be referred to as a Kubernetes cluster. The Kubernetes cluster includes a server 210, on which a Kubernetes master 215 runs, and self-service terminals (SSTs) 2201, 2202, on which respective Kubernetes workers 2301, 230¬2 run. It will be appreciated that the server 210 may be a physical server or a cloud server. The server 210 and the SSTs communicate over a network 205 such as a local area network or the internet. The network may be wired and/or wireless. It will be appreciated that devices other than SSTs may be connected to the network and run a Kubernetes worker.

The Kubernetes master 215 which runs on the server 210 includes an API server 216 that manages the Kubernetes cluster. The API server 216 issues commands based on information it receives from other internal components of the master 215 and interfaces with external components such as kubectl 212 and kubelets (such as kubelet 231 on SST2 2202) which are running on Kubernetes workers 2301, 2302. Etcd 217 is a distributed database for the Kubernetes cluster which stores information such as the configuration of the cluster. Etcd 217 also stores the desired state of the Kubernetes workers 2301, 230¬2 and the actual state of the Kubernetes workers 2301¬, 230¬2. A state may be understood as being an indication of the pods (such as Pod 3 235 on SST2 2202) and their containers (such as container 236 in Pod 235) that are running on each Kubernetes worker 2301, 230¬2 in the cluster. A scheduler 218 monitors when new pods are to be run on a Kubernetes worker and then decides which Kubernetes worker to deploy them on. A controller-manager 219 runs controller processes which attempt to move the actual state of the Kubernetes workers 2301, 230¬2 closer to the desired state specified on etcd 217. The master 215 also contains kubectl 212, a command-line tool for communicating with the Kubernetes cluster via the API server 216, and an operator interface 211.

Each Kubernetes worker 2301, 230¬¬2 located within the Kubernetes cluster runs on an SST. According to certain embodiments of the present invention, the worker may run on a virtual machine of the SST. The worker 230 is able to communicate with other workers 230 and the master 215 through the network 205. Each worker 230 has a kubelet that manages the operation of the worker 230. The kubelet (such as kubelet 231 on SST 2202) issues commands to the other components of the worker 2302, monitors the pods running on the worker (such as pod 235) and their containers (such as container 236), and communicates with the API server 216. The kubelet 231 receives deployment files and ensures that the containers 236 described in those deployment files are running and healthy. A kube-proxy (such as kube-proxy 232) is a network proxy which enables pods, in both the same Kubernetes worker and a different worker to communicate. A container engine (such as engine 233) runs and manages containers, receiving commands from the kubelet and container images from a registry. The container engine prepares container metadata which is passed on to a container runtime (such as container runtime 234), that is responsible for the running of the containers within the Kubernetes worker that the runtime is located within.

A pod exists within any Kubernetes worker after the pod is deployed to a Kubernetes worker by the API server 216 of the Kubernetes master 215. The pod commonly includes a single container although the pod may comprise multiple containers with similar functions, which will share storage and network resources. The pod is able to request access to specific resources available to the worker through the kubelet, or to communicate with other pods by using the kube-proxy.

Figure 3:
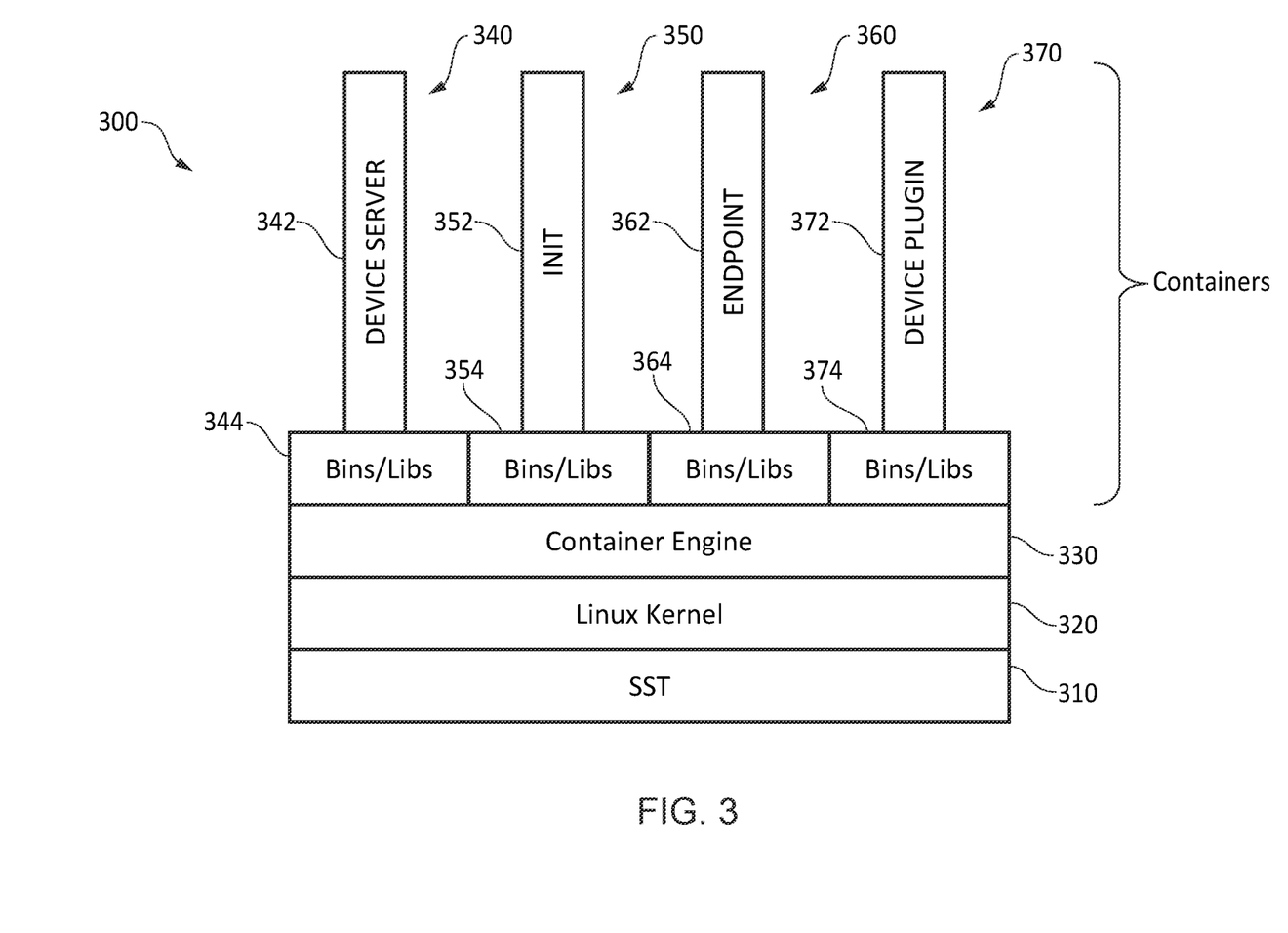
FIG. 3 illustrates a hardware and software architecture for a self-service terminal that executes several software containers.

FIG. 3 illustrates a hardware and software architecture 300 for a self-service terminal that is configured to execute several software container elements. In FIG. 3, the underlying hardware is an SST 310. This may be one of the SSTs described with respect to FIG. 1 or FIG. 2. As described hereinabove, the SST includes one or more processors and at least one memory. The memory stores executable software that is executable by the processors. The executable software includes a Linux kernel 320 which may be part of a Host Operating System (such as Unix or Ubuntu or the like). It will be appreciated that in certain other embodiments of the present invention other kernels and other host operating systems could be utilized (Windows, Mac etc.). Also included as part of the executable software is a container engine 330. The container engine is responsible for accepting user requests or requests from an API server of a container orchestrator (such as Kubernetes, Swarm, Mesos, or the like), pulling image files (in a particular image format) from a registry, preparing a container mount point, preparing metadata that is needed to execute a software container and calling a container runtime. The container runtime (not shown) is a part of the container engine. The container runtime (such as runc, containerd, crun, railcar, katacontainers, or the like) uses the mount point and the metadata provided by the container engine and communicates with the Linux kernel 320 running on the computing device in order to execute several container image files and thereby create several software containers. The executable image files for each of the software containers shown in FIG. 3 may be downloaded from a registry. In FIG. 3, four software container elements are illustrated. A first software container element 370 is referred to as the device plugin container. The device plugin container includes application software 372 and associated binaries and libraries 374 (the binaries and libraries may be referred to as software dependencies). The application running in the device plugin container is responsible for advertising what peripheral devices are connected to the SST as described herein below. The device plugin container may include only a single layer. The device plugin container may thus be referred to as 'distro-less' container where all dependencies are built into a single (often Golang) executable. A second software container element 340 is referred to as the device server container. The device server container includes application software 342 and associated binaries and libraries 344 (the binaries and libraries may be referred to as software dependencies). The application running in the device server container is responsible for controlling, configuring or otherwise accessing one or more of the peripheral devices connected to the SST at a low level and exposing business level functions across the network to other components of the SST. For example, the device server may talk via the 'USB' protocol to a scanner (low-level) and report scanned bar-codes (business level) to other components. The software within the device server container is able to access the peripheral device paths and thus use or interact with the peripheral devices. A third software container element 350 is referred to as the INIT container. The INIT container includes application software 352 and associated binaries and libraries 354 (the binaries and libraries may be referred to as software dependencies). The application running in the INIT container initializes in its Pod before the main (non-INIT) containers start. The INIT container is a concept of the Kubernetes system but it will be appreciated that containers which are configured to execute first (i.e., before other containers) may also be utilized in other container orchestration platforms. A fourth software container element 360 is referred to as the Endpoint container. The Endpoint container includes application software 362 and associated binaries and libraries 364 (the binaries and libraries may be referred to as software dependencies). The application running in the Endpoint container makes information about an SST, such as the motherboard Universally Unique Identifier (UUID), available to the rest of the Kubernetes cluster. As can be seen in FIG. 3, each software container element has its own binaries and libraries (bins/libs). However, it will be appreciated that according to certain other embodiments of the present invention any combination of containers could share bins/libs.

Figure 4:
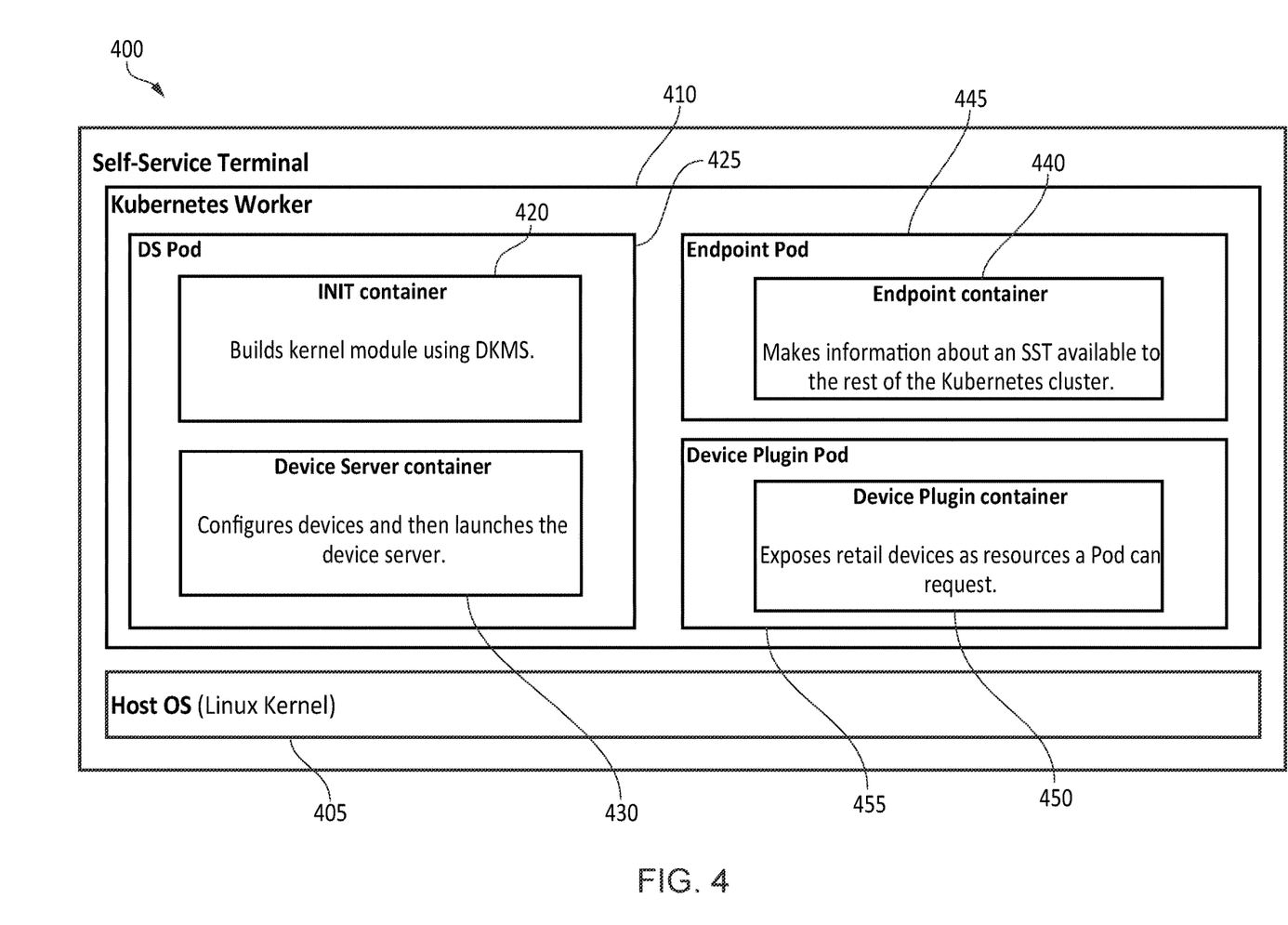
FIG. 4 illustrates software container elements that execute on a self-service terminal.

Turning now to FIG. 4, what is illustrated is a self-service terminal 400 and the software container elements that are configured to be executed on the self-service terminal (that is on one or more processors of the SST). Each of the software containers on the SST contains executable software (defined by an image file). The executable software is executed in the containers in such a way that the software is executed in an isolated computing environment. The software is isolated in the sense that it does not depend on any of the other software containers also executing on the SST to operate. The software effectively executes in its own computing environment and communicates with hardware/software outside this environment through predefined communication pathways. Providing the executable software within software containers means that the software is able to be executed independent of computing environment. In FIG. 4, the containers are managed using the Kubernetes container orchestration platform. The SST shown in FIG. 4 may be the SST described with reference to any of FIGS. 1-3 above. The SST 400 runs a Linux kernel 405 as part of a Host Operating System. Other Operating Systems could of course be used according to certain other embodiments of the present invention. Using the Kubernetes system, the self-service terminal executes software referred to as a Kubernetes worker 410. The Kubernetes worker may also be referred to as a node. A first software container element 450, a second software container element 430, a third software container element 420 and a fourth software container element 440 are included within the Kubernetes worker 410. The Kubernetes platform is responsible for managing these containers as described with reference to FIG. 2. The first, second, third and fourth software containers may be the same containers as described with reference to FIG. 3. The self-service terminal 400 also includes additional software (not shown) that executes external to the Kubernetes worker 410. In the Kubernetes worker 410, the second software container 430 and the third software container 420 are executed within a single pod referred to as a device server pod 425. Because the third software container 420 is of the INIT type, it is the first container executed within the device server pod (i.e., it executes before the device server container). The fourth software container 440 is executed within a single pod referred to as an Endpoint pod 445. The first software container 450 is executed within a single pod referred to as a Device Plugin pod 455. The creation of each of these pods is defined by three different pod specification files (i.e., deployment.YAML files) as will be appreciated by a person of skill in the art. Pods are used in Kubernetes to provide containers with shared storage and network resources, and a specification for how to run the containers within the pods. During operation of the SST 400, each of these pods/containers are executed by a container runtime (not shown) of a container engine (not shown). The image file associated with each of these containers may be downloaded from a registry.

Figure 5:
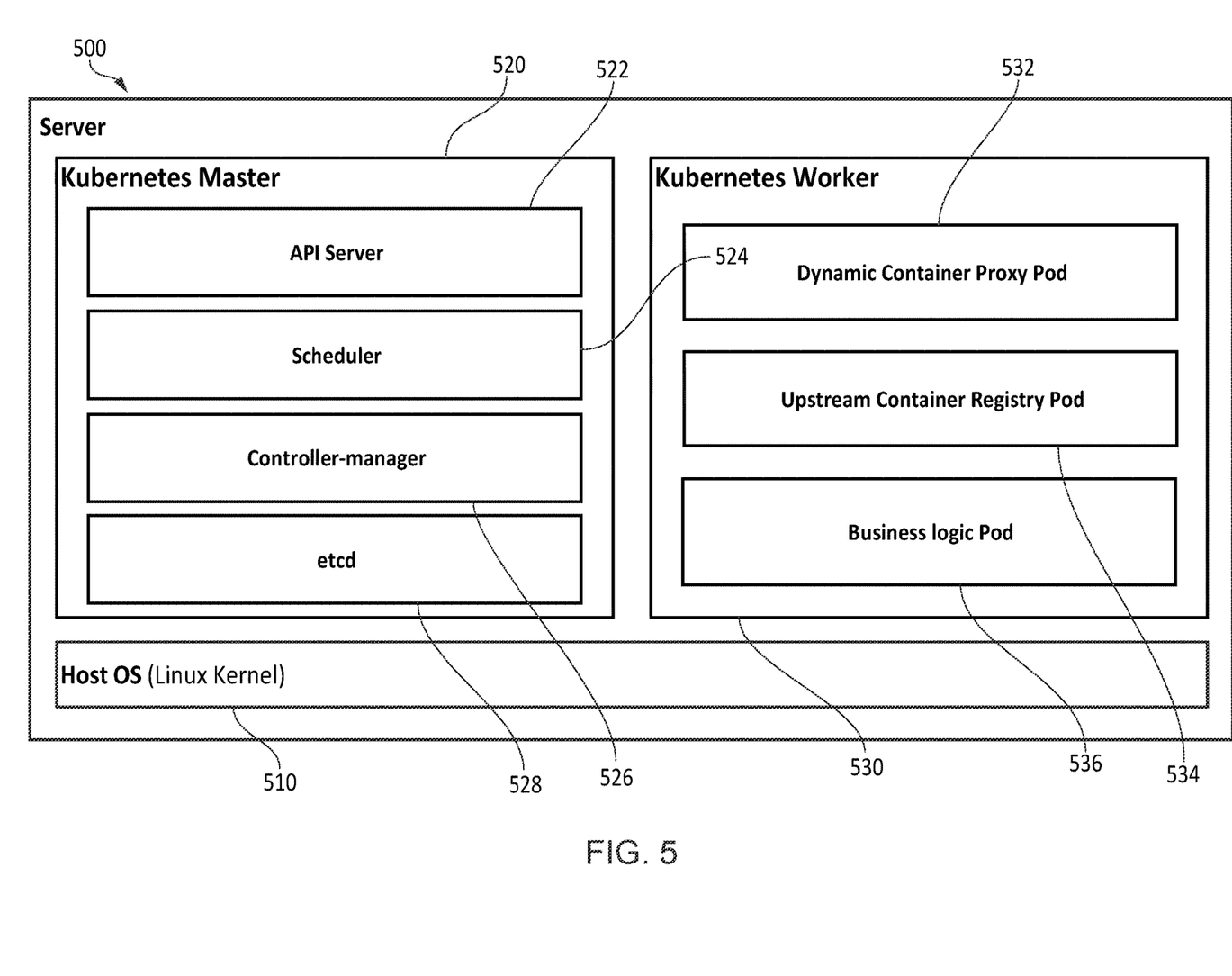
FIG. 5 illustrates software that executes on a server in communication with multiple self-service terminals.

FIG. 5 illustrates a server 500 running Kubernetes master and Kubernetes worker in isolation. The server may be in communication with multiple SSTs (not shown in FIG. 5). The server has one or more processors (not shown) and at least one memory (not shown). The memory stores executable software that is executed by the processors at runtime. The executable software includes a Linux kernel 510 (of a Host OS). It will be appreciated that in certain other embodiments of the present invention, other Operating Systems can be used. The executable software also includes a Kubernetes master 520. The Kubernetes master includes similar components as described above with reference to FIG. 2. These are an API server 522, Scheduler 524, Controller-manager 526 and etcd database 528. A Kubernetes worker 530 also executes on the server. The Kubernetes worker 530 includes three pods which themselves include a software container element. A first pod on the server is a dynamic container proxy pod 532. This pod includes a corresponding dynamic container proxy software container. The dynamic proxy software container is responsible for receiving requests from a container engine for executable image files. A second pod on the server is an upstream container registry pod 534. This pod includes a corresponding upstream container registry software container. The registry container is responsible for storing image files and providing these image files to the container engine on request. A third pod on the server is a business logic pod 536. This pod includes a corresponding business logic software container.

Figure 6:
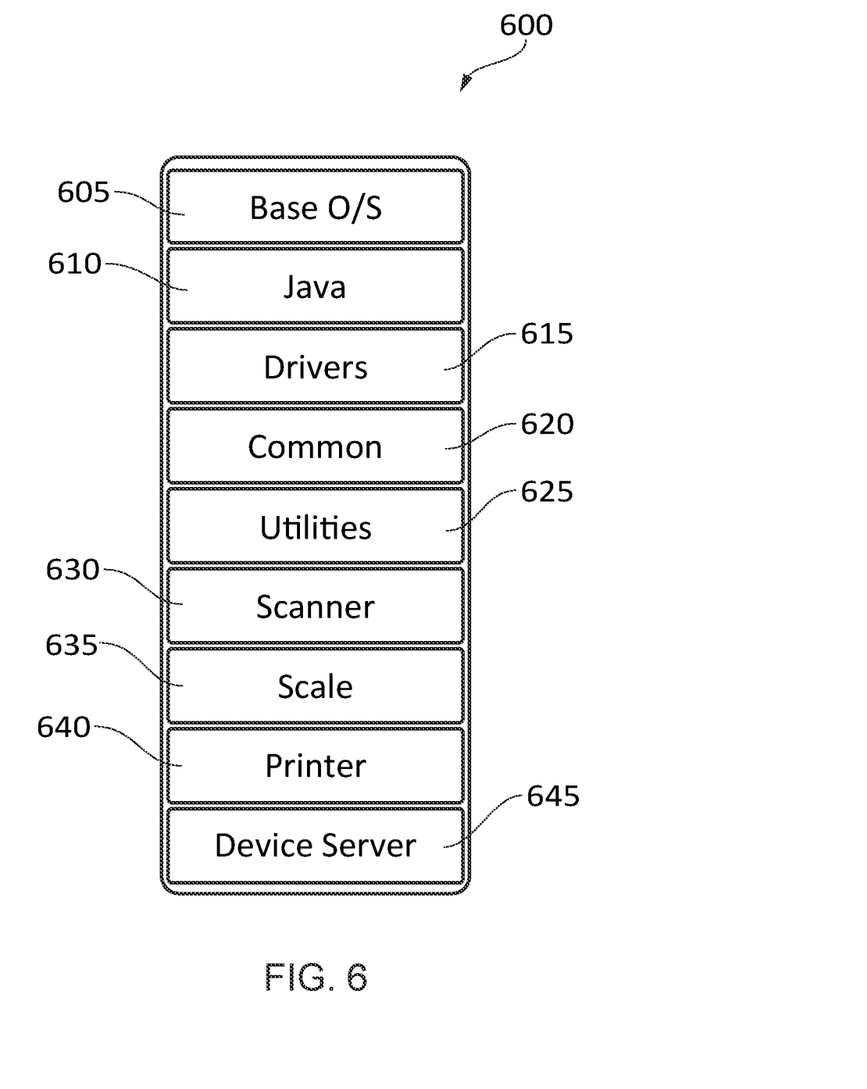
FIG. 6 illustrates the layers of an executable image file.

FIG. 6 illustrates a schematic representation of an executable image file 600 for execution as a software container. The image file shown in FIG. 6 is executable to provide the device server container of FIG. 4. As can be seen in FIG. 6, the executable image file has a Base Operating System layer 605, a Java layer 610, a Drivers layer 615, a Common layer 620, a Utilities layer 625, a Scanner layer 630, a Scale layer 635, a Printer layer 640 and a Device Server layer 645. This image file with these layers may be stored in the registry and downloaded on request from a container engine of a terminal. The Base OS layer defines the operating system that is to be utilized within the software container (e.g., Ubuntu). However, the Base OS layer may not be needed in certain other embodiments of the present invention. The Java layer defines executable instructions for interpreting a Java programming language. However, it will be appreciated that in certain other embodiments of the present invention, the Java layer may not be needed when other programming languages are used. The Drivers layer is an optional layer which defines executable instructions responsible for installing user-space drivers into the image. An example of a user-space driver might be a low-level USB helper. It will be appreciated that some images may not require any user-space drivers. The Common layer defines executable instructions containing framework components that are shared or used by other layers. An example of such a framework may be a logging framework that is used to control and capture logs from other components. The Utilities layer is an optional layer defining executable instructions including user facing utilities and tools. An example of such a tool may be a system maintenance utility that can be used to view the list of devices that are installed on the SST and interact with them with operations such as running a diagnostic check. Collectively the Drivers, Common and Utilities layers may be referred to as software dependencies. It will be appreciated that the driver layer and/or common layer and/or utilities layer may not be required in certain embodiments of the present invention. The Scanner layer defines executable instructions for communicating with a scanner peripheral device, the Scale layer defines executable instructions for communicating with a scale peripheral device and the printer layer defines executable instructions for communicating with a printer peripheral device. These layers may be referred to as peripheral device driver image layers. It will be appreciated that the layers for the scanner, scale and printer are layers associated with a specific scanner, scale or printer. As an example, the scanner may be an NCR 2356 Hand Held Scanner, the scale may be an NCR 8789 Scale, and the printer may be an NCR 7169 thermal receipt printer. It will also be appreciated that in certain other embodiments of the present invention, layers associated with other peripheral devices (barcode reader, cameras etc.) may be needed. It will also be appreciated that the peripheral device image layers shown in FIG. 6 may not always be needed. The device server layer defines the executable instructions for controlling, configuring or otherwise accessing one or more of the peripheral devices connected to the SST at a low level and exposing business level functions across the network to other components of the SST.

Figure 7:
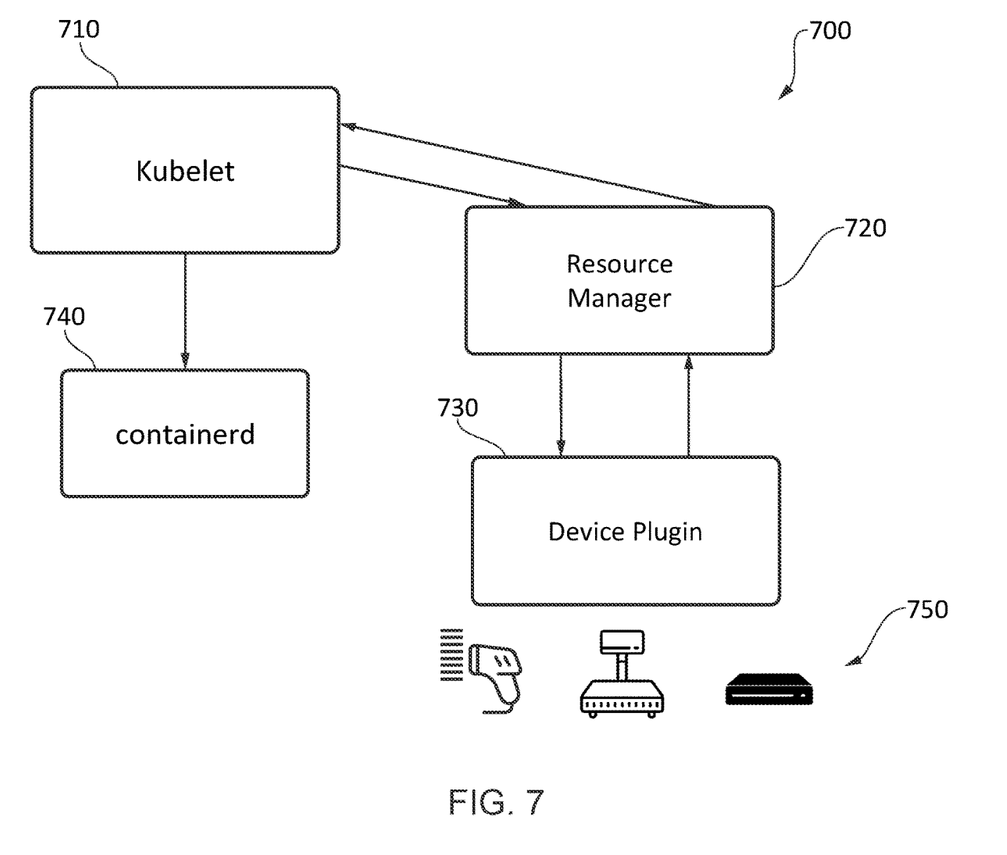
FIG. 7 illustrates several components of a computing system that provides a software container including peripheral device connection data.

FIG. 7 illustrates certain components of a computing system 700. The components shown in FIG. 7 are present on a SST or POS terminal such as the SSTs described with reference to FIGS. 1-4. In more detail, FIG. 7 shows a kubelet 710, a resource manager 720, a device plugin element 730, a containerd runtime element 740 and certain connected peripheral devices 750. The kubelet is a software application employed on the SST as part of the Kubernetes orchestration platform. This software application is used to manage software containers running on the SST. The resource manager (although shown separately for clarity) is part of the kubelet. The resource manager is responsible for enumerating the resources available on a node and identifying them via the kubelet to other components of the Kubernetes system, in particular the Kubernetes scheduler. The resources may include resources such as RAM, CPU, local persistent storage and the like and may be extended with custom resources. The custom resources can be low-level or generic. For example, the custom resources may be generically 'a USB device at port 10 on bus 2' or may be more functionally explicit such as 'a barcode scanner'. The resource manager is also responsible for managing resource capacity such as the number of resources of a particular type that are available. The resource manager is also responsible for preparing a device for attaching to a container, or to clean it up after it is detached from a container. For example, such as when a device is reset to factory conditions before it is attached to a container. The device plugin may be executed as a software container. However, it will be appreciated that according to certain other embodiments of the present invention the device plugin need not be executed as a software container. The device plugin element is a module that includes executable instructions that are executed on a processor (or multiple processors) of an SST or POS terminal. The device plugin(s) is/are responsible for managing custom resources. The device plugin module(s) communicate with connected peripheral devices and the resource manager of the kubelet. The device plugin provides the kubelet with information which enables software containers to be provided having access to all peripheral devices within a class. This is explained in more detail below. The containerd runtime element is a container runtime which is part of a container engine. The runtime executes an image file as a software container. The runtime is provided with information from the kubelet in order to execute any necessary software containers. How these components interact with one another is now described.

On startup of the SST, and after the software components shown in FIG. 7 have been executed and are running on the SST, the Kubelet 710 calls the resource manager to find out what resources are available. The resource manager 720 reports the standard resources (RAM, CPU etc.) and also calls the device plugin(s) to discover additional custom resources. It is noted that one or more device plugins may be present. The resource manager does this by sending a query to the device plugin querying what devices are physically connected to the SST. This query is received at the device plugin and in response to this query, the device plugin enumerates the custom resources and reports what they are and how many of each are available back to the kubelet. Particularly, the device plugin 730 provides data to the resource manager identifying one or more, possibly overlapping, abstract classes of devices, such as all known printers, scanners, scales, displays and retail-devices connectable to the SST. In this example the retail-device class might be a single class including printers, scanners and scales. This class may not include certain types of devices, such as displays. The kubelet records the resources (standard and custom) against the Kubernetes worker object in the Kubernetes API server data-model. From there the information about available resources can be used by components like the Kubernetes scheduler to make decisions about workload (Pod) scheduling. For example if a workload identifies it needs a barcode scanner then it can be scheduled on a Kubernetes worker that has at least one device in that class available.

The definition of the retail peripheral devices associated with a class (such as the retail-device class) is stored in memory on the SST. This may for example be in the form of rules defining membership of a device to a particular group (or class), stored in a configuration map (a Config-Map). The rules in the configuration map may include 'regular-expressions' to identify the devices that fall into a class based on its device path. The configuration map may additionally or alternatively support filtering by, for example, device vendor, class and sub-class (USB concepts).

It will be appreciated that in certain other embodiments of the present invention, the set of retail peripheral devices associated with the class could be stored elsewhere (such as on a server). It will also be appreciated that in certain other embodiments of the present invention, the device plugin may send data indicative of multiple classes (e.g., a printer device class, a scanner device class, a scale device class and the like) to the resource manager in response to the query. In such a case, the resource manager manages the resource availability across the particular classes which may be complicated because of the potential overlapping nature of the classes. For example if a workload has already been assigned 'scanners' and another workload requests 'retail-devices' it may only be possible to assign the subset of retail-devices that are not scanners to a new container.

Once the Kubernetes scheduler has decided to schedule a workload (pod) which needs specific resources on a particular Kubernetes worker, the kubelet talks again to the resource manager to allocate standard and custom resources to the pod. In the case of custom resources the resource manager communicates with the device plugin and requests for the class of peripheral devices (previously advertised to the resource manager) to be made ready for assignment to the workload. To do this the resource manager sends a command to the device plugin. The command that is sent commands the device plugin to prepare each of the peripheral devices associated with the retail device class for assignment to a pod/container. In response to receiving the request the device plugin also sends further data which identifies the path (i.e., the pathway at which a peripheral device can be accessed) for each device in the class that is to be assigned to the Pod and passes this information back to the resource manager. It will thus be appreciated that the plugin container thus effectively sends a large number of dummy device pathways or nodes (as there will not be any connected peripheral device for many of the pathways) to the resource manager. These are shared with the kubelet and container runtime. The runtime stores data indicative of each of the possible device pathways within a control group (cgroup) and associates this cgroup with the container to be executed. These pathways or the cgroup may be referred to as peripheral device connection data. The pathways may be stored in the cgroup in the device major:minor number format in Linux, for example format 189:0, 189:1, 189:2. The container runtime then uses this information to ensure the containers in the Pod have the necessary permissions to access the devices when the container is executed.

As an example of this, the device plugin may provide pathways each ending in '/dev/dummy/1', '/dev/dummy/2' and so forth, and these pathways may be stored in a cgroup in device major and minor number format (189:0), (189:1) and so on. This may be carried out for as many peripheral devices in the class as necessary. The container cgroup thus stores the dummy device pathways, which will only become visible to the container as they are required by real devices being connected. In other words, the container would still only see device '/dev/bus/usb/001/002' equating to (189:1) if there is a device physically connected to the corresponding USB port.

Once these steps have been carried out, the kubelet instructs the containerd runtime element to execute a software container element (as determined by the scheduler) according to a specific pod specification (deployment file). The container runtime then provides a software container element by downloading and executing the image file specified in the deployment file. The software container element is associated with the cgroup such that upon execution the container is associated with peripheral device connection data that enables the software container element to have access to and communicate with each peripheral device of the plurality of predetermined peripheral devices associated with each class. The deployment file includes an indication of an executable image file for the software container and resources required. This may include custom resources such as the retail-devices class. It will be appreciated that even when a device is connected after the software container has started, the device will be accessible to the container because the pathway where the new device is located is defined in the container's cgroup.

Once the software container has been executed, it is responsible for determining whether or not each exposed device path represents a device that it is interested in using. This could be done by using software implementing a device discovery process. The executed software container thus determines which devices associated with the class are actually connected to the SST. The software container then initializes each of the connected peripheral devices. Once the connected peripheral devices are initialized, the software container element may then send commands to each of the peripheral devices.

The software implementing the device discovery process is configured to be executed within the software container at predefined intervals. However, it will be appreciated that in certain other embodiments of the present invention, the device discovery process may also be executed continuously. Thus, in the example where a new peripheral device is plugged in, the device discovery process is used to determine that this new device is present and is then responsible for initializing the device. The new device may then be sent commands as discussed above.

It will be appreciated that by providing a software container element associated with peripheral device connection data as described above, the software container is able to access each of a set of peripheral devices associated with a predefined class. Thus, it does not matter if the peripheral devices are connected when the container is initially executed as the container will still be able to access these devices because the pathway has already been defined in the container's cgroup. By taking this approach the software container is also able to communicate with new peripheral devices that are plugged in at a later date (after execution of the software container) or that are unplugged and replugged (after execution of a software container). This unplug-replug event may be a virtual event as a result of a software update. Thus, the software container has the flexibility to communicate at any time with all peripheral devices associated with a predefined class without requiring privileged access and without compromising on security.

Figure 8:
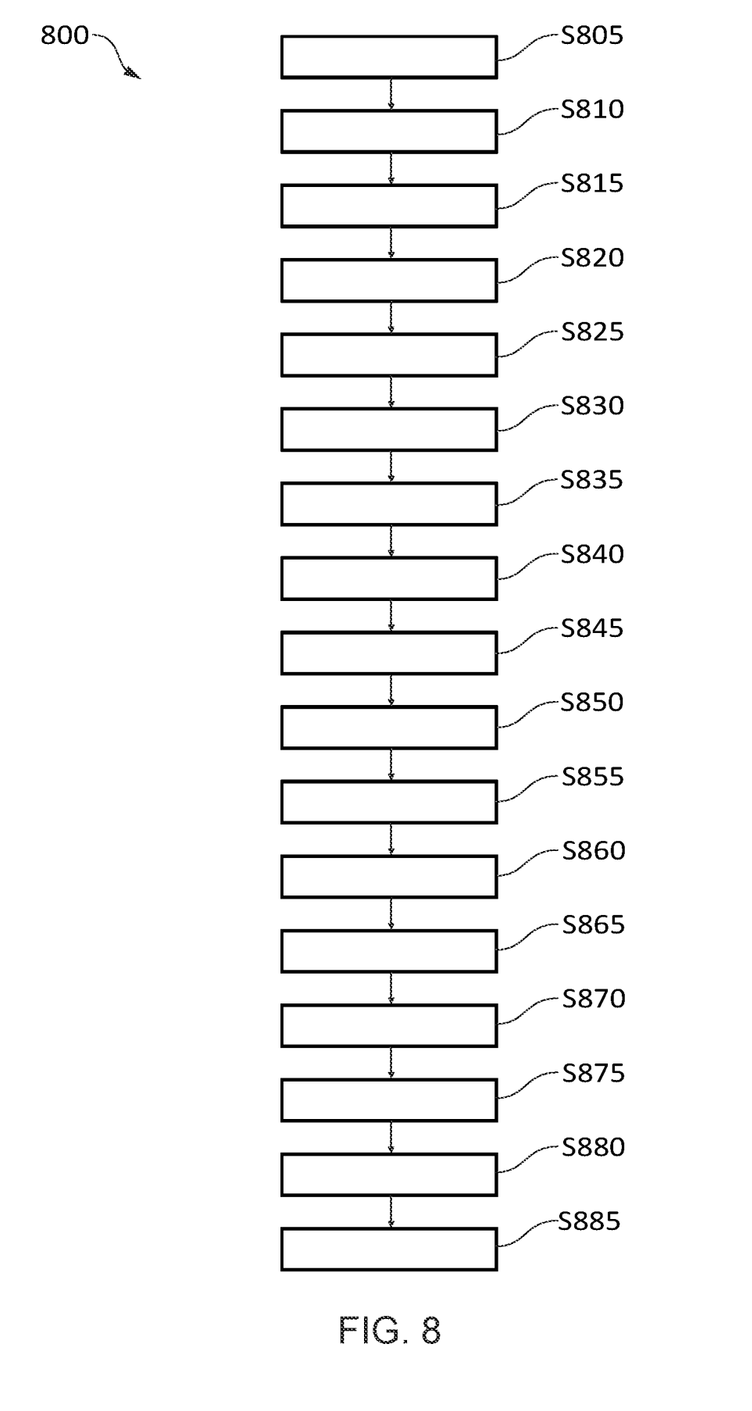
FIG. 8 illustrates a flow chart describing how a software container is provided that is configured to have access to and communicate with each peripheral device of a class of peripheral device.

FIG. 8 illustrates a block diagram 800 of certain steps that take place when a software container element associated with peripheral device connection data is initialized on a self-service terminal (SST). The SST may be any of the SSTs illustrated in FIGS. 1 to 7. The software container element associated with peripheral device connection data may be referred to as a second software container element. The second software container element contains executable instructions that are executed on a processor (or multiple processors) of the SST. When an SST is initially deployed, a first step S805 involves creating one or more deployment files specifying the configuration of instances of containers which should be initialized upon startup of the SST. The deployment file, amongst other things, specifies a name of an image file to be downloaded and executed to provide a software container. The deployment file also specifies what resources will be accessible by the container. Once the deployment file(s) is/are created, the deployment file(s) is/are uploaded to an API server of the Kubernetes master that is running on a server in communication with the SST. The Kubernetes master may be the same master as illustrated with respect to FIG. 2 or FIG. 5. The API server receives the deployment file(s) and stores the deployment file(s) in the etcd database of the Kubernetes master. Another step S810 carried out when the SST is initially deployed involves storing data in a memory accessible by the SST. The data may be stored for example on the SST or on a server in communication with the SST. The data indicates certain predetermined peripheral devices that are associated with a class of peripheral device. The data may be stored as a configuration map.

A next step S815 is powering on the SST. This may occur daily such as when a store is opened for business or if the terminal is restarted. The software on the SST, including the host OS and the Kubernetes worker configuration is then loaded from the memory of the SST and executed by the processors of the SST. When a Kubernetes worker configuration is loaded, there will be no pods running initially. A next step S820 involves detecting, by a controller-manager of the Kubernetes master, a difference between the pods that should be running on the SST as specified in the deployment files stored on etcd and the pods that are currently running on the SST. The available resources on the Kubernetes worker will also be checked to determine that the resources required by a pod are available on the Kubernetes worker. This includes checking standard resources like RAM and CPU and also the custom resources handled by the device plugin. Responsive to detecting that pods that should be executing on the SST are not, and that suitable resources are available, the API server of the Kubernetes master sends information to a kubelet on the SST to resolve this inconsistency. This information includes a deployment file for each pod that is to be executed on the SST. It will be appreciated that according to certain other embodiments of the present invention that do not make use of the Kubernetes orchestration platform, containers may be executed without the need for being run within pods (which are a particular feature of the Kubernetes system). A next step S825 involves receiving, by the kubelet, the information from the API server and passing deployment files to a container engine element on the SST.

Responsive to receiving the deployment files, a next step S830 involves reading, by the container engine, the deployment files and requesting executable image files specified in the deployment files from a container image registry. A next step S835 then involves executing a Device Plugin Pod on the SST by the container engine. The Device Plugin Pod includes a device plugin container. The device plugin container may be referred to as a first software container element. The first software container element contains executable software that can be executed on a processor (or multiple processors) of the SST. The device plugin container is responsible for exposing one or more abstract classes of devices as custom resources, providing device path information for all devices within these classes, and enabling plug and play device support. Once executed, the device plugin container is called (by the resource manager) to report its custom resources. The resource manager keeps track of what custom resources the device plugin container advertises are available on the Kubernetes worker. A next step S835 involves sending, by a resource manager of the kubelet, a query to the device plugin container querying which and how many peripheral devices are connected to the SST. According to certain other embodiments of the present invention, it will be appreciated that the resources available to the device plugin container can be advertised automatically to the resource manager.

In response to this query, a next step S840 involves sending data indicative of a class of peripheral device connectable to the SST to the resource manager of the kubelet. The data is sent from the device plugin container. The class is associated with a predetermined set of peripheral devices. This class is advertised as a resource which may be referred to as <retail-devices>. As noted above, the devices within the class may be defined in a configuration map in memory on the SST. Once the resource manager receives this data, a next step S845 involves the resource manager requesting that the abstract class of peripheral devices be made ready for assignment to a container/pod (in response to a pod needing the resource being scheduled for execution on the SST). This request is sent by the resource manager to the device plugin container as a command that is interpreted by the plugin container. Responsive to this command, a next step S850 involves sending, by the device plugin container, data indicating device pathways for each peripheral device in the class. In other words, the device plugin container converts the request for an abstract set/class of devices to the set of paths representing the devices in the abstract set/class. The device pathways are pre-determined by the OS. This data is received by the resource manager. This data effectively represents a dummy list of all possible (existing and future) device pathways, one for each predetermined peripheral device associated with the class. This data may be referred to as peripheral device connection data and may be associated with a software container. A next step 855 may involve storing the peripheral device connection data in a particular format in a control group (cgroup). The data within the control group may thus also be referred to as peripheral device connection data.

Once the resource manager receives the device pathway data, a next step S860 involves the kubelet advertising the devices in the class as being available device resources which containers on the Kubernetes cluster can request. A next step S865 involves the kubelet instructing a container runtime (of a container engine) to execute a second software container element. This may be the device server container of FIG. 4. The step 865 further includes a step (not shown) of associating peripheral device connection data with the executed software container. This may be achieved by associating the control group (which includes data indicative of the peripheral device pathways) with the container. The software container is executed by passing a deployment file to the container engine. The container engine interprets the deployment file, downloads the image file specified in the deployment file, and passes the image file to the container runtime for execution. When the container runtime executes the image file, it thereby provides the second software container element. When the second software container element is provided, it is associated with peripheral device connection data which is provided by the kubelet to the container engine. As discussed above, this may be achieved by associating the container with a cgroup. It will be appreciated that the peripheral device connection data represents the pathways for each of the predetermined peripheral devices associated with the class which has been advertised as an accessible resource by the kubelet.

A next step S870 involves the second software container element determining which peripheral devices associated with the class are connected as physical devices at each of the locations on the device pathway list.

A next step S875 involves the second software container element establishing a communication link between the second software container and the peripheral device. If a link is established, a next step S880 involves initializing the peripheral devices connected to the SST. This may be achieved by the second software container communicating with the peripheral devices along the corresponding device pathways. Thus, the second software container is able to discover and manage physical devices.

In a next step S885, if a device is either reconnected or a new device is connected to the SST whilst the SST is running, the second software container element discovers new or reconnected devices by following similar steps as described in steps S870-S880. Thereafter, the second software container can initialize and communicate with the newly connected (or re-connected) device using the relevant device pathway, despite the new device not being present on initialization of or despite being removed during execution of the second software container.

A deployment file may be utilized by a Kubernetes master or a container engine running on an SST in order to prompt some of the steps discussed in FIG. 8. That is to say that the container engine processes this deployment file in order to initiate steps of providing a software container element that is configured to have access to and communicate with each peripheral device associated with a predefined class. The deployment file specifies the number and configuration of pods running a container or containers in a Kubernetes cluster. Each container in the pod is a runtime instance of the image defined in the deployment file. Part of the configuration of the container, when executed, is determined by the defined 'resources' of the deployment file. As an example, the container, when executed, may be able to access all the devices within "scanner-devices" and "display-devices" classes.

Throughout the description and claims of this specification, the words "comprise" and "contain" and variations of them mean "including but not limited to" and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Although the present disclosure has been particularly shown and described with reference to the preferred embodiments and various aspects thereof, it will be appreciated by those of ordinary skill in the art that various changes and modifications may be made without departing from the spirit and scope of the disclosure. It is intended that the appended claims be interpreted as including the embodiments described herein, the alternatives mentioned above, and all equivalents thereto.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of the features and/or steps are mutually exclusive. The invention is not restricted to any details of any foregoing embodiments. The invention extends to any novel one, or novel combination, of the features disclosed in this specification (including any accompanying claims, abstract and drawings), or to any novel one, or any novel combination, of the steps of any method or process so disclosed.

What is claimed is:

1. A computer-implemented method for providing a software container element associated with peripheral device connection data that enables the software container element to have access to and communicate with each peripheral device of a plurality of predetermined peripheral devices, the method comprising the steps of:
   receiving, from a module comprising first executable software that is executable on one or more processors of a computing device, first data indicative of at least one class of peripheral device connectable to the computing device, whereby each class is associated with a plurality of predetermined peripheral devices; and
   providing a software container element that contains second executable software that is executable on said one or more processors of the computing device, whereby the software container element is associated with peripheral device connection data that enables the software container element to have access to and communicate with each peripheral device of the plurality of predetermined peripheral devices associated with each class.

2. The method as claimed in claim 1, further comprising:
   receiving the first data as data indicative of a single class of peripheral device connectable to the computing device, whereby the single class is associated with a plurality of predetermined peripheral devices connectable to a self-service terminal or point of sale terminal.

3. The method as claimed in claim 1, further comprising:
   responsive to a new peripheral device being connected to the computing device or to a peripheral device being disconnected and reconnected to the computing device, determining, by the software container element, that the new or reconnected peripheral device is connected to the computing device.

4. The method as claimed in claim 1, further comprising:
   storing second data, indicative of the plurality of predetermined peripheral devices associated with each class, in memory accessible by the computing device.

5. The method as claimed in claim 1, further comprising:
   prior to receiving the first data, sending a query to the module querying which peripheral devices are connected to the computing device.

6. The method as claimed in claim 1, further comprising:
   receiving the first data at a software application responsible for managing software container elements on the computing device.

7. The method as claimed in claim 1, further comprising:
   providing the module as a module that is configured to communicate with connected peripheral devices.

8. The method as claimed in claim 1, further comprising:
   providing the module as a software container element that contains the first executable software, wherein optionally the module is a device plugin module.

9. The method as claimed in claim 1, further comprising:
   responsive to receiving the first data, sending at least one command to the module commanding the module to prepare each of the plurality of predetermined peripheral devices associated with each class for assignment to the software container element.

10. The method as claimed in claim 1, further comprising:
    receiving, from the module, third data indicative of at least a respective peripheral device pathway for each of the plurality of predetermined peripheral devices associated with each class.

11. The method as claimed in claim 1, further comprising:
    providing the peripheral device connection data as data representative of at least a respective peripheral device pathway for each of the plurality of predetermined peripheral devices associated with each class.

12. The method as claimed in claim 1, further comprising:

storing the peripheral device connection data in a control group associated with the software container element.

13. The method as claimed in claim 1, further comprising:

upon execution of the second executable instructions, determining, by the software container element, which peripheral devices, of the plurality of predetermined peripheral devices associated with each class, are connected to the computing device.

14. The method as claimed in claim 13, further comprising:

responsive to determining, initializing, by the software container element, each peripheral device connected to the computing device.

15. The method as claimed in claim 14, further comprising:

responsive to initializing, sending, by the software container element, one or more commands to at least one of the connected peripheral devices.

16. The method as claimed in claim 1, further comprising:

providing the first executable software and the second executable software as software that is executable independent of computing environment.

17. The method as claimed in claim 1, further comprising:

via the module and the software container element respectively, executing the first executable software and the second executable software in an isolated computing environment.

18. A computing device comprising one or more processors configured to execute a software application responsible for managing software container elements on the computing device, wherein the software application, when executed, is configured to:

receive, from a module comprising first executable software that is executable on one or more processors of a computing device, first data indicative of at least one class of peripheral device connectable to the computing device, whereby each class is associated with a plurality of predetermined peripheral devices; and provide a software container element that contains second executable software that is executable on said one or more processors of the computing device, whereby the software container element is associated with peripheral device connection data that enables the software container element to have access to and communicate with each peripheral device of the plurality of predetermined peripheral devices associated with each class.

19. The computing device as claimed in claim 18, wherein the computing device is a point of sale terminal or self-service terminal.

* * * * *